United States Patent

Matsubara et al.

(10) Patent No.: US 10,309,842 B2
(45) Date of Patent: Jun. 4, 2019

(54) MAGNET TEMPERATURE ESTIMATION DEVICE FOR ROTATING ELECTRIC MACHINE AND MAGNET TEMPERATURE ESTIMATION METHOD FOR ROTATING ELECTRIC MACHINE

(71) Applicant: HONDA MOTOR CO., LTD., Tokyo (JP)

(72) Inventors: Munehiro Matsubara, Shimotsuga-gun (JP); Yuta Ito, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 217 days.

(21) Appl. No.: 15/309,515

(22) PCT Filed: May 8, 2015

(86) PCT No.: PCT/JP2015/063324
§ 371 (c)(1),
(2) Date: Nov. 8, 2016

(87) PCT Pub. No.: WO2015/170747
PCT Pub. Date: Nov. 12, 2015

(65) Prior Publication Data
US 2017/0131158 A1  May 11, 2017

(30) Foreign Application Priority Data

May 9, 2014  (JP) .................................. 2014-098125

(51) Int. Cl.
*G01K 17/06* (2006.01)
*G01K 13/02* (2006.01)
(Continued)

(52) U.S. Cl.
CPC ............... *G01K 17/06* (2013.01); *G01K 7/42* (2013.01); *G01K 13/02* (2013.01); *G01K 13/08* (2013.01);
(Continued)

(58) Field of Classification Search
USPC ......................................................... 702/130
See application file for complete search history.

(56) References Cited

U.S. PATENT DOCUMENTS

2009/0284202 A1    11/2009  Miura
2010/0140002 A1*    6/2010  Miura .................... B60K 6/445
                                                  180/65.285
(Continued)

FOREIGN PATENT DOCUMENTS

CN    101589546 A    11/2009
CN    103516292 A     1/2014
(Continued)

OTHER PUBLICATIONS

International Search Report dated Jul. 21, 2015, issued in counterpart application No. PCT/JP2015/063324, w/ English Translation. (4 pages).
(Continued)

*Primary Examiner* — Paul D Lee
(74) *Attorney, Agent, or Firm* — Westerman, Hattori, Daniels & Adrian, LLP

(57) ABSTRACT

A magnet temperature estimation device for a rotating electric machine includes a rotating electric machine configured with a rotor having a magnet and a stator having a coil, a coolant supply part configured to supply a coolant flowing from the stator toward the rotor, and a magnet temperature calculation part configured to calculate a temperature of the magnet using a temperature of a coolant that receives heat from the coil.

13 Claims, 9 Drawing Sheets

(51) Int. Cl.
- *H02K 11/25* (2016.01)
- *H02K 9/00* (2006.01)
- *H02K 9/19* (2006.01)
- *H02K 1/32* (2006.01)
- *G01K 7/42* (2006.01)
- *G01K 13/08* (2006.01)
- *H02P 29/60* (2016.01)
- *H02P 29/66* (2016.01)

(52) U.S. Cl.
CPC ............... *H02K 1/32* (2013.01); *H02K 9/005* (2013.01); *H02K 9/19* (2013.01); *H02K 11/25* (2016.01); *H02P 29/60* (2016.02); *H02P 29/66* (2016.02); *G01K 2013/026* (2013.01); *G01K 2205/00* (2013.01)

(56) References Cited

U.S. PATENT DOCUMENTS

| | | | | |
|---|---|---|---|---|
| 2012/0323430 | A1* | 12/2012 | Nakamura | B60L 11/1803 701/22 |
| 2013/0294888 | A1* | 11/2013 | Yokoyama | H02K 1/32 415/47 |
| 2013/0342049 | A1* | 12/2013 | Stridsberg | H02K 1/32 310/58 |
| 2014/0126606 | A1* | 5/2014 | Ito | G01K 7/427 374/163 |
| 2014/0126607 | A1* | 5/2014 | Oya | G01K 7/427 374/163 |
| 2014/0191696 | A1* | 7/2014 | Hattori | H02K 9/19 318/473 |
| 2015/0145442 | A1* | 5/2015 | Miyamoto | B60K 6/445 318/98 |
| 2015/0222216 | A1* | 8/2015 | Ogawa | B60L 3/12 318/490 |

FOREIGN PATENT DOCUMENTS

| | | |
|---|---|---|
| JP | 2006-050746 A | 2/2006 |
| JP | 2010-213539 A | 9/2010 |
| JP | 4572907 B2 | 11/2010 |
| JP | 2013-093929 A | 5/2013 |

OTHER PUBLICATIONS

Office Action dated Apr. 11, 2018, issued in counterpart Chinese Application No. 201580023794.6, with partial English translation. (6 pages).

* cited by examiner

MAGNET TEMPERATURE ESTIMATION DEVICE FOR ROTATING ELECTRIC MACHINE AND MAGNET TEMPERATURE ESTIMATION METHOD FOR ROTATING ELECTRIC MACHINE

TECHNICAL FIELD

The present invention relates to a magnet temperature estimation device for a rotating electric machine and a magnet temperature estimation method for a rotating electric machine.

Priority is claimed on Japanese Patent Application No. 2014-098125, filed May 9, 2014, the contents of which are incorporated herein by reference.

BACKGROUND ART

In the related art, a motor control device configured to calculate a magnet temperature on the basis of a stator coil temperature, a liquid temperature of a cooling liquid, a heat generating ratio and a heat resistance ratio during operation of a motor is known (for example, see Patent Document 1). The motor control device previously acquires a ratio of a heat resistance between a cooling liquid and a stator coil and a heat resistance between the stator coil and a permanent magnet as a heat resistance ratio, and acquires a ratio of heat generation of the stator coil and heat generation of the permanent magnet as a heat generation ratio.

PRIOR ART DOCUMENTS

Patent Documents

Patent Document 1: Japanese Patent No. 4572907

SUMMARY OF INVENTION

Problems to be Solved by the Invention

However, according to the motor control device in the related art, a liquid temperature of a cooling liquid flowing toward the outside from an inside of the motor is detected outside the motor, and a heat resistance ratio is acquired on the basis of results of experiments that are previously performed. For this reason, a calculation error of a magnet temperature may be increased according to such as a flowing path and a cooling state of the cooling liquid inside the motor.

In consideration of the above-mentioned circumstances, an object of an aspect of the present invention is to provide a magnet temperature estimation device for a rotating electric machine and a magnet temperature estimation method for a rotating electric machine that are capable of improving estimation precision of the magnet temperature of a rotating electric machine.

Means for Solving the Problems

In order to solve the above-mentioned problems and accomplish the above-mentioned purposes, the present invention employs the following aspects.

(1) A magnet temperature estimation device for a rotating electric machine according to an aspect of the present invention includes a rotating electric machine configured with a rotor having a magnet and a stator having a coil; a coolant supply part configured to supply a coolant flowing from the stator toward the rotor; and a magnet temperature calculation part configured to calculate a temperature of the magnet using a temperature of the coolant has that received heat from the coil.

(2) In the aspect of the above mentioned (1), the magnet temperature calculation part may calculate a heat resistance of at least a portion between the magnet and the coolant that has received heat from the coil, calculate a heat reduction amount from the magnet using the heat resistance and a temperature of the coolant that has received heat from the coil, and calculate the temperature of the magnet using the heat reduction amount from the magnet.

(3) In the aspect of the above mentioned (2), the magnet temperature calculation part may calculate the heat resistance in accordance with a flow rate of the coolant and number of revolutions of the rotating electric machine.

(4) In the aspect of the above mentioned (2) or (3), a heating value calculation part configured to calculate a heating value due to loss of the magnet may be provided, and the magnet temperature calculation part may calculate the temperature of the magnet using the heating value due to the loss of the magnet and the heat reduction amount from the magnet.

(5) In any one aspect of the above mentioned (1) to (4), a coolant temperature calculation part configured to calculate the temperature of the coolant that has received heat from the coil may be provided, and the coolant temperature calculation part may acquire a beat receiving amount of the coolant that has received heat from the coil and a heat capacity of the coolant in accordance with the flow rate of the coolant, and calculate the temperature of the coolant that has received beat from the coil using the heat receiving amount of the coolant that has received heat from the coil and the heat capacity of the coolant.

(6) In the aspect of the above mentioned (5), a cooling part configured to cool the coolant may be provided, and the coolant temperature calculation part may acquire a heat resistance between the coil and the coolant that has received heat from the coil in accordance with the flow rate of the coolant, and calculate the heat receiving amount of the coolant that has received heat from the coil using the heat resistance between the coil and the coolant that has received heat from the coil, the temperature of the coil, and a temperature of the coolant cooled by the cooling part.

(7) A magnet temperature estimation method for a rotating electric machine is performed by a control device with respect to: a rotating electric machine configured with a rotor having a magnet and a stator having a coil, and a coolant supply part configured to supply a coolant flowing from the stator toward the rotor, and the magnet temperature estimation method for a rotating electric machine includes calculating a temperature of the magnet using a temperature of a coolant that has received heat from the coil.

Advantageous Effects of Invention

The magnet temperature estimation device for a rotating electric machine according to the aspect of the above mentioned (1) includes the magnet temperature calculation part configured to calculate the temperature of the magnet using the temperature of the coolant after the coolant flowing from the stator toward the rotor has received heat from the coil. For this reason, the calculation precision of the temperature of the magnet can be improved. In addition, the magnet temperature estimation device for a rotating electric machine according to the aspect of the above mentioned (1) includes the magnet temperature calculation part using a heat model in which the coolant that receives heat from the coil cools the magnet. For this reason, the temperature of the magnet can be precisely calculated according to a cooling path of the coolant in the rotating electric machine and a cooling state of the coil and the magnet by the coolant.

Further, in the aspect of the above mentioned (2), the magnet temperature calculation part configured to calculate the heat resistance of at least a portion between the magnet and the coolant that has received heat from the coil and configured to calculate the heat reduction amount from the magnet using the heat resistance may be provided. For this reason, the heat radiation amount from the magnet due to the coolant can be precisely calculated.

Further, in the aspect of the above mentioned (3), the magnet temperature calculation part configured to calculate the heat resistance of at least a portion between the magnet and the coolant that has received heat from the coil in accordance with the flow rate of the coolant and the number of revolutions of the rotating electric machine. For this reason, the heat resistance can be precisely calculated according to a state of the coolant in the rotor.

Further, in the aspect of the above mentioned (4), the magnet temperature calculation part configured to calculate the temperature of the magnet using the heating value due to loss of the magnet and the heat reduction amount from the magnet may be provided. For this reason, the temperature variation of the magnet according to a difference between the heating value and the heat reduction amount can be precisely calculated.

Further, in the aspect of the above mentioned (5), the coolant temperature calculation part configured to acquire the heat receiving amount of the coolant that has received heat from the coil and the heat capacity of the coolant in accordance with the flow rate of the coolant may be provided. For this reason, the temperature of the coolant can be precisely calculated according to a state (a contact state or the like) of the coolant that receives heat from the coil in the rotor.

Further, in the aspect of the above mentioned (6), the coolant temperature calculation part configured to acquire the heat resistance between the coil and the coolant that has received heat from the coil in accordance with the flow rate of the coolant may be provided. For this reason, the heat resistance can be precisely calculated according to a state of the coolant in the coil.

In the magnet temperature estimation method for a rotating electric machine according to the aspect of the above mentioned (7), the magnet temperature calculation part configured to calculate the temperature of the magnet using the temperature of the coolant after the coolant flowing from the stator toward the rotor receives heat from the coil may be provided. For this reason, the calculation precision of the temperature of the magnet can be improved. In addition, the magnet temperature estimation method for a rotating electric machine according to the aspect of the above mentioned (7) includes the magnet temperature calculation part using a heat model in which the coolant that receives heat from the coil cools the magnet. For this reason, the temperature of the magnet can be precisely calculated according to a cooling path of the coolant in the rotating electric machine and a cooling state of the coil and the magnet due to the coolant.

DESCRIPTION OF EMBODIMENT

Hereinafter, a magnet temperature estimation device for a rotating electric machine and a magnet temperature estimation method for a rotating electric machine according to an embodiment of the present invention will be described with reference to the accompanying drawings.

Figure 1:
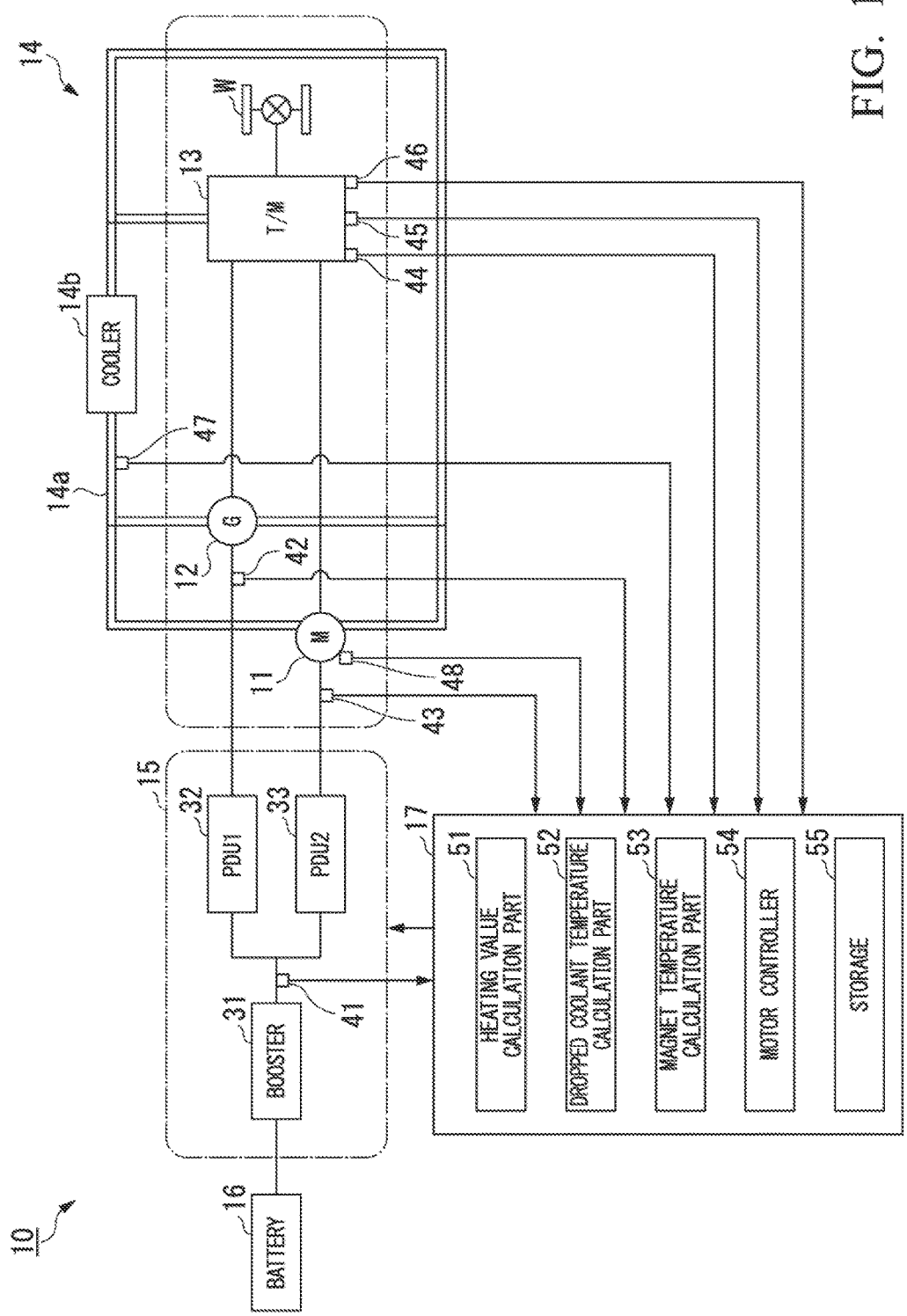
FIG. 1 is a view showing a configuration of a magnet temperature estimation device for a rotating electric machine according to an embodiment of the present invention.

A magnet temperature estimation device 10 for a rotating electric machine according to the embodiment is mounted on a vehicle 1 such as a hybrid vehicle, an electrically driven vehicle, or the like. As shown in FIG. 1, the vehicle 1 includes a driving motor (M) 11 (a rotating electric machine), a generating motor (G) 12, a transmission (T/M) 13, a coolant circulation section 14 (a coolant supply part), a power conversion part 15, a battery 16, and a control device 17.

Each of the driving motor 11 and the generating motor 12 is, for example, a 3-phase alternating brushless DC motor, or the like. Each of the driving motor 11 and the generating motor 12 includes a rotary shaft connected to the transmission 13. The rotary shaft of the generating motor 12 is connected to a mechanical pump of the coolant circulation section 14, which will be described below.

Figure 2:
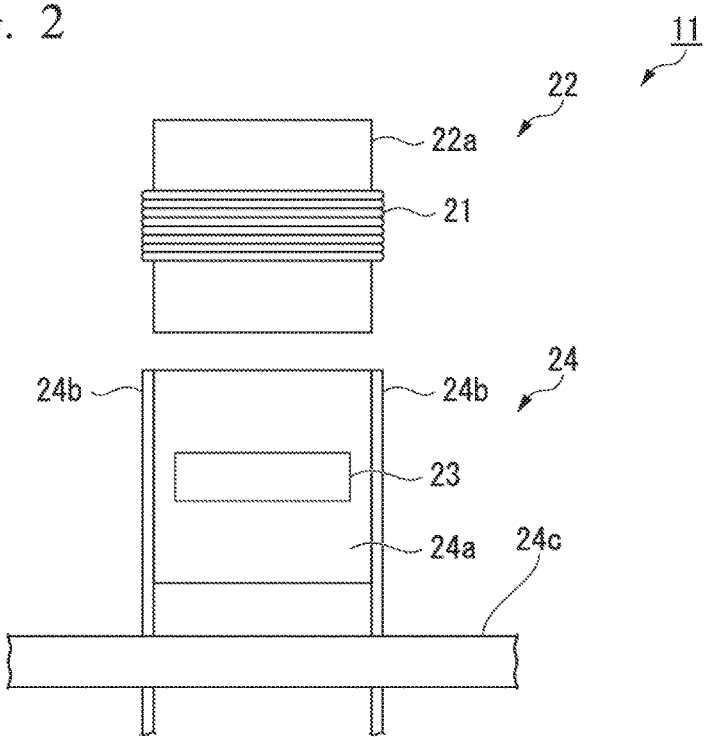
FIG. 2 is a cross-sectional view showing a partial configuration of a driving motor of the magnet temperature estimation device for a rotating electric machine according to the embodiment of the present invention.

As shown in FIG. 2, the driving motor 11 includes a stator 22 having a coil 21, and a rotor 24 having a magnet 23. The driving motor 11 is an inner rotor type and includes the rotor 24 in the stator 22 having a cylindrical shape.

The coil 21 is, for example, a segment conductor (SC) winding, or the like. The coil 21 is mounted in a slot formed between teeth of a stator core 22a. The coil 21 is connected to the power conversion part 15, which will be described below. The magnet 23 is, for example, a permanent magnet or the like.

The magnet 23 is held in a rotor yoke 24a not to come into direct contact with a pair of end surface plates 24b that sandwich the rotor yoke 24a from both sides in an axial direction of a rotary shaft 24c.

The generating motor 12 includes, for example, the same configuration as the driving motor 11.

The transmission 13 is, for example, an automatic transmission (AT) or the like. The transmission 13 is connected to the driving motor 11, the generating motor 12 and driving wheels W. The transmission 13 controls power transmission between the driving wheels W and each of the driving motor 11 and the generating motor 12 according to a control signal output from the control device 17, which will be described below.

The coolant circulation section 14 includes a coolant flow path 14a through which coolant circulates, and a cooler 14b (a cooling part) configured to cool the coolant. The coolant circulation section 14 uses, for example, working oil for performing lubrication, power transmission, and so on in the transmission 13 of the automatic transmission (AT) as coolant.

The coolant flow path 14a is connected to a flow path of the working oil in the transmission 13 and an inside of each of the driving motor 11 and the generating motor 12. The coolant flow path 14a includes an ejection port (not shown) configured to eject coolant to each of the driving motor 11 and the generating motor 12, and a suction port (not shown) configured to suction the coolant flowing through the inside of each of the driving motor 11 and the generating motor 12.

The ejection port of the coolant flow path 14a is disposed over each of the driving motor 11 and the generating motor 12 in a vertical direction. The suction port of the coolant flow path 14a is disposed at a coolant storage section (not shown) formed under each of the driving motor 11 and the generating motor 12 in the vertical direction.

The cooler 14b includes a mechanical pump installed at the coolant flow path 14a and connected to the rotary shaft of the generating motor 12. The mechanical pump generates a suction force by driving of the generating motor 12 and causes the coolant in the coolant flow path 14a to flow toward the ejection port while suctioning the coolant from the suction port of the coolant flow path 14a. The cooler 14b cools the coolant flowing through the coolant flow path 14a.

The coolant circulation section 14 ejects the coolant from the ejection part of the coolant flow path 14a toward a coil end of the coil 21 (a portion protruding outward from a slot of the stator core 22a in an axial direction thereof) according to an operation of the mechanical pump of the cooler 14b with respect to the driving motor 11.

The coolant flows downward in the vertical direction on the coil end of the coil 21 and a surface of the stator core 22a by an action of gravity. The coolant flows downward in the vertical direction such that the coolant is dropped from the coil end of the coil 21 or the stator core 22a onto the end surface plates 24b via a gap between the stator 22 and the rotor 24 by the action of gravity. The coolant (dropped coolant) dropped on the surfaces of the end surface plates 24b flows on the surfaces of the end surface plates 24b to an outside of the end surface plates 24b by a centrifugal force due to a rotation of the rotor 24 and the action of gravity. The dropped coolant flows into the coolant storage section from the outside of the end surface plates 24b by the action of gravity.

Figure 3:
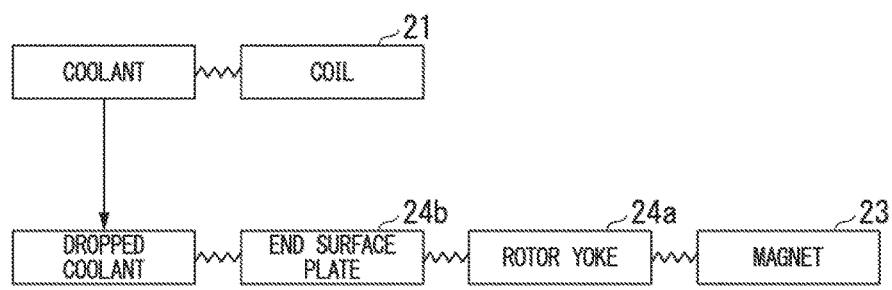
FIG. 3 is a view schematically showing a heat model of the magnet temperature estimation device for a rotating electric machine according to the embodiment of the present invention.

The coolant circulation section 14 suctions the coolant stored in the coolant storage section from the suction port into the coolant flow path 14a by a suction of the mechanical pump, and performs cooling by the cooler 14b. Accordingly, as shown in FIG. 3, the coolant circulation section 14 cools the coil 21 and the stator core 22a using the coolant. The coolant circulation section 14 directly cools the end surface plates 24b using the dropped coolant, and indirectly and sequentially cools the rotor yoke 24a and the magnet 23 via the end surface plates 24b using the dropped coolant.

The power conversion part 15 includes a booster 31 configured to increase an output voltage of the battery 16, a second power drive unit (PDU2) 33 configured to control electrical conduction of the driving motor 11, and a first power drive unit (PDU1) 32 configured to control electrical conduction of the generating motor 12.

The booster 31 includes, for example, a DC-DC converter or the like. The booster 31 is connected between the battery 16 and the first and second power drive units 32 and 33.

The booster 31 generates a voltage applied to the first and second power drive units 32 and 33 by increasing an output voltage of the battery 16 according to a control signal output from the control device 17, which will be described below. The booster 31 outputs the applied voltage generated by increasing the output voltage of the battery 16 to the first and second power drive units 32 and 33.

The first and second power drive units 32 and 33 include, for example, inverter devices or the like. The first and second power drive units 32 and 33 include bridge circuits and smoothing condensers formed by, for example, bridging and connecting a plurality of switching elements (for example, MOSFETs or the like) as inverter devices. The first and second power drive units 32 and 33 convert direct current output power of the booster 31 into 3-phase alternating current power according to a control signal output from the control device 17, which will be described below. The first power drive unit 32 electrically conducts a 3-phase alternating current to the 3-phase coil 21 such that electrical conduction to the generating motor 12 is sequentially conmmutated. In addition, the second power drive unit 33 electrically conducts a 3-phase alternating current to the 3-phase coil 21 such that electrical conduction to the driving motor 11 is sequentially commutated.

The control device 17 is configured with a central processing unit (CPU), various storage media such as a random access memory (RAM) or the like, and an electronic circuit such as a timer or the like. The control device 17 outputs a control signal to control the transmission 13 and the power conversion part 15. The control device 17 is connected to a voltage sensor 41, a first current sensor 42, a second current sensor 43, a first number-of-revolutions sensor 44, a second number-of-revolutions sensor 45, a torque sensor 46, a coolant temperature sensor 47 and a coil temperature sensor 48.

The voltage sensor 41 detects the applied voltage applied to each of the first and second power drive units 32 and 33 from the booster 31. The first current sensor 42 detects an alternating current (a phase current) flowing between the first power drive unit 32 and each of the coil 21 of the generating motor 12. The second current sensor 43 detects an alternating current (a phase current) flowing between the second power drive unit 33 and each of the coil 21 of the driving motor 11.

The first number-of-revolutions sensor 44 detects the number of revolutions of the driving motor 11 by sequentially detecting the rotation angle of the rotary shaft of the driving motor 11. The second number-of-revolutions sensor 45 detects the number of revolutions of the generating motor 12 by sequentially detecting the rotation angle of the rotary shaft of the generating motor 12.

The torque sensor 46 detects torque of the driving motor 11. The coolant temperature sensor 47 detects the temperature of the coolant output from the cooler 14b in the coolant flow path 14a (the coolant temperature after passing through the cooler).

The coil temperature sensor 48 is, for example, a thermistor or the like, and detects a temperature of the coil 21 of the driving motor 11 (a coil temperature).

As shown in FIG. 1, the control device 17 includes a heating value calculation part 51, a dropped coolant temperature calculation part 52, a magnet temperature calculation part 53, a motor controller 54 and a storage 55.

The heating value calculation part 51 calculates a heating value due to a loss of each part in each of the driving motor 11 and the generating motor 12. For example, the heating value calculation part 51 calculates heating values of a copper loss of the 3-phase coil 21, an iron loss of the rotor yoke 24a and an eddy current loss of the magnet 23 in the driving motor 11.

The heating value calculation part 51 calculates the copper loss of the 3-phase coil 21 according to a 3-phase phase current of the driving motor 11 detected by the second current sensor 43 and a resistance value of the 3-phase coil 21 previously stored in the storage 55.

Figure 4:
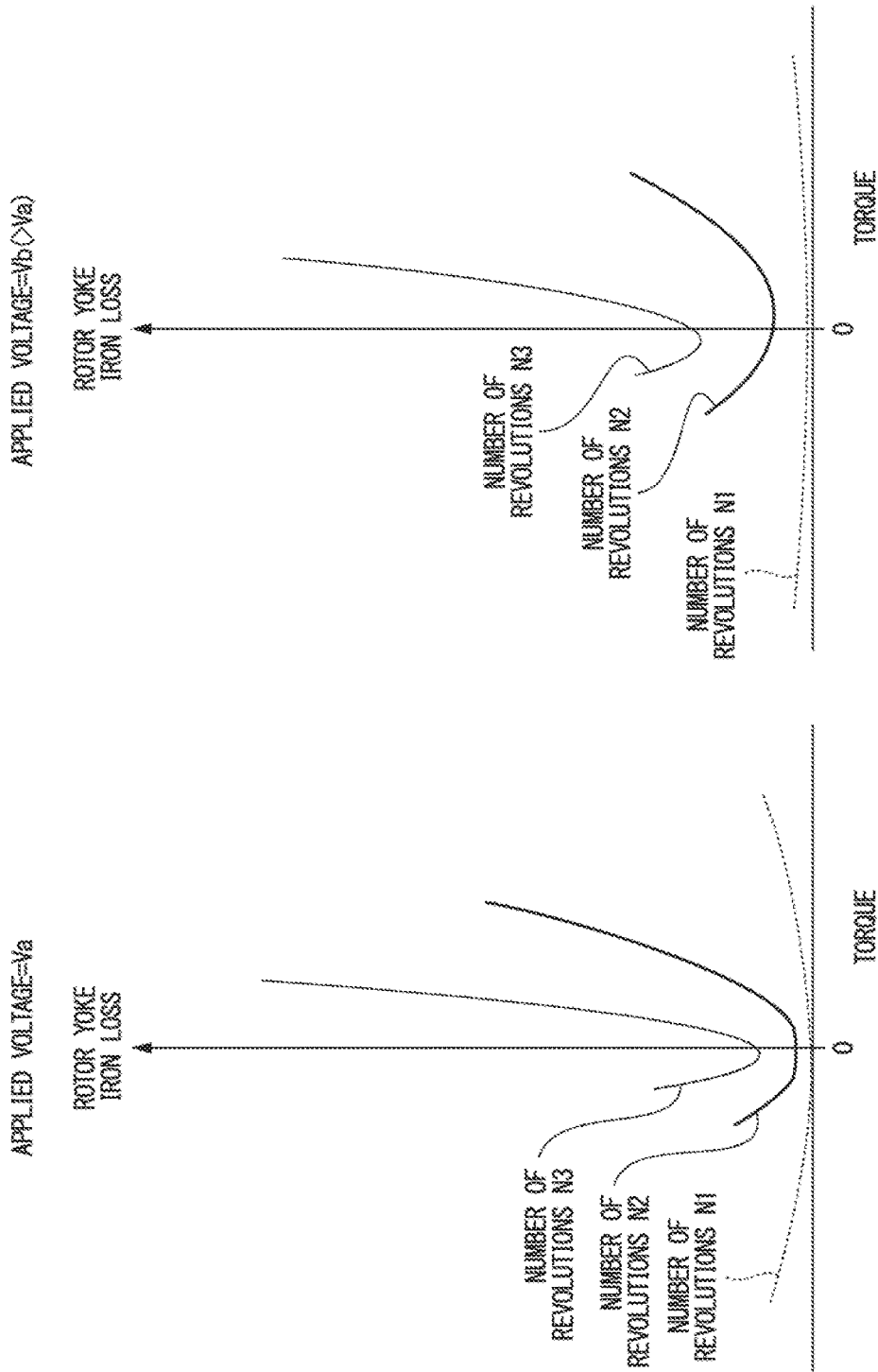
FIG. 4 is a view showing an interrelation between an applied voltage, the number of revolutions, torque and an iron loss of a rotor yoke in the driving motor of the magnet temperature estimation device for a rotating electric machine according to the embodiment of the present invention.

The heating value calculation part 51 calculates an iron loss $W_{YOKE}$ of the rotor yoke 24a according to the applied voltage detected by the voltage sensor 41, the number of revolutions of the driving motor 11 detected by the first number-of-revolutions sensor 44, and the torque of the driving motor 11 detected by the torque sensor 46. As shown in FIG. 4, the heating value calculation part 51 previously stores data such as a map or the like showing a mutual relationship between the applied voltage, the number of revolutions, the torque, and the iron loss $W_{YOKE}$ of the rotor yoke 24a in the storage 55. The heating value calculation part 51 calculates the iron loss $W_{YOKE}$ of the rotor yoke 24a with reference to the data previously stored in the storage 55 using the applied voltage, the number of revolutions and the torque detected by the sensors 41, 44 and 46. The heating value calculation part 51 calculates the iron loss $W_{YOKE}$ while performing linear interpolation or the like with respect to the applied voltage and the number of revolutions, for example, using the map showing the mutual relationship between the torque and the iron loss $W_{YOKE}$ with respect to combinations of a plurality of different applied voltages (Va<Vb) and the numbers of revolutions (N1<N2<N3).

Figure 5:
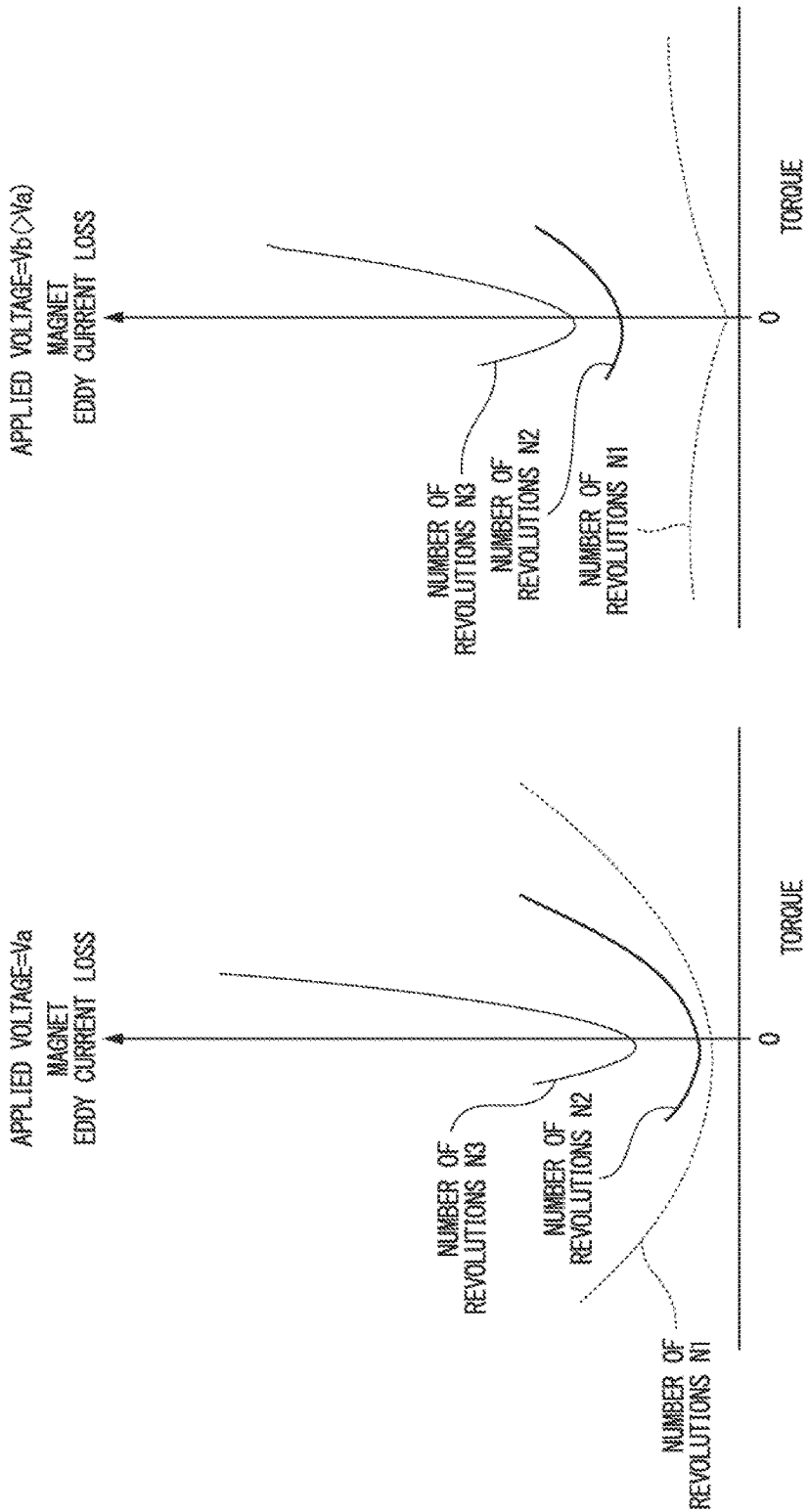
FIG. 5 is a view showing an interrelation between an applied voltage, the number of revolutions, torque and an eddy current loss of a magnet in the driving motor of the magnet temperature estimation device for a rotating electric machine according to the embodiment of the present invention.

The heating value calculation part 51 calculates the eddy current loss $W_{MAG}$ of the magnet 23 according to the applied voltage detected by the voltage sensor 41, the number of revolutions of the driving motor 11 detected by the first number-of-revolutions sensor 44, and the torque of the driving motor 11 detected by the torque sensor 46. As shown in FIG. 5, the heating value calculation part 51 previously stores data such as the map or the like showing the mutual relationship between the applied voltage, the number of revolutions, the torque, and the eddy current loss $W_{MAG}$ of the magnet 23 in the storage 55. The heating value calculation part 51 calculates the eddy current loss $W_{MAG}$ of the magnet 23 with reference to the data previously stored in the storage 55 using the applied voltage, the number of revolutions and the torque detected by the sensors 41, 44 and 46. The heating value calculation part 51 calculates the eddy current loss $W_{MAG}$ while performing linear interpolation or the like with respect to the applied voltage and the number of revolutions, for example, using the map showing the mutual relationship between the torque and the eddy current loss $W_{MAG}$ with respect to combinations of the plurality of different applied voltages (Va<Vb) and the numbers of revolutions (N1<N2<N3).

The dropped coolant temperature calculation part 52 calculates a temperature $T_{DATF}$ of the dropped coolant according to the coolant temperature after passing through the cooler detected by the coolant temperature sensor 47, the number of revolutions of the generating motor 12 detected by the second number-of-revolutions sensor 45, and the coil temperature detected by the coil temperature sensor 48.

Figure 6:
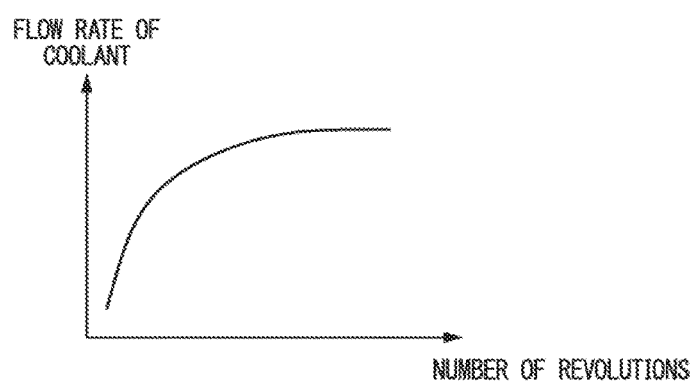
FIG. 6 is a view showing an interrelation between the number of revolutions of a generating motor and a flow rate of a coolant of the magnet temperature estimation device for a rotating electric machine according to the embodiment of the present invention.

The dropped coolant temperature calculation part 52 acquires a flow rate of the coolant circulating in the coolant circulation section 14 according to the number of revolutions of the generating motor 12 detected by the second number-of-revolutions sensor 45. As shown in FIG. 6, the dropped coolant temperature calculation part 52 previously stores data such as a map or the like showing a mutual relationship between the number of revolutions of the generating motor 12 and the flow rate of the coolant in the storage 55. The dropped coolant temperature calculation part 52 calculates the flow rate of the coolant with reference to the data previously stored in the storage 55 using the number of revolutions detected by the second number-of-revolutions sensor 45.

The dropped coolant temperature calculation part 52 calculates a heat receiving amount $Q_{co\text{-}atf}$ of the dropped coolant from the 3-phase coil 21 according to the coolant temperature after passing through the cooler detected by the coolant temperature sensor 47, the coil temperature detected by the coil temperature sensor 48, and the flow rate of the coolant.

Figure 7:
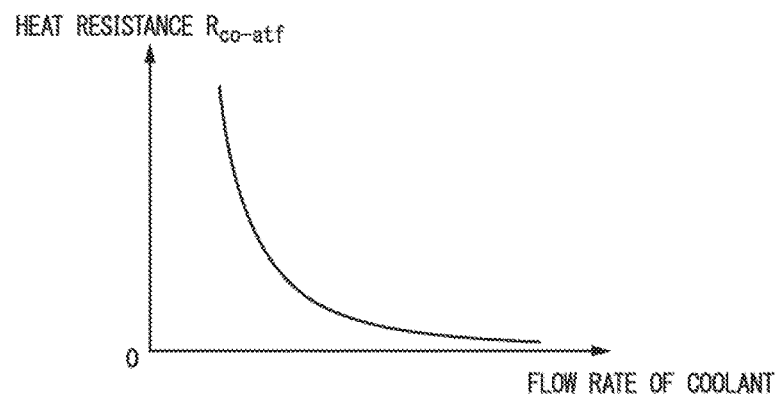
FIG. 7 is a view showing an interrelation of a flow rate of a coolant and heat resistance between a dropped coolant and a 3-phase coil in the driving motor of the magnet temperature estimation device for a rotating electric machine according to the embodiment of the present invention.

As shown in FIG. 7, the dropped coolant temperature calculation part 52 previously stores data such as a map or the like showing a mutual relationship between a heat resistance $R_{co\text{-}atf}$ between the dropped coolant and the 3-phase coil 21, and the flow rate of the coolant in the storage 55. The dropped coolant temperature calculation part 52 calculates the heat resistance $R_{co\text{-}atf}$ between the dropped coolant and the 3-phase coil 21 with reference to the data previously stored in the storage 55 using the calculated flow rate of the coolant.

The dropped coolant temperature calculation part 52 calculates the heat receiving amount $Q_{co\text{-}atf}$ using the calculated heat resistance $R_{co\text{-}atf}$, a coolant temperature $T_{atf}$ after passing through the cooler and a coil temperature $T_{co}$ as expressed in the following Equation (1).

[Math. 1]

$$Q_{co\text{-}atf} = \frac{T_{co} - T_{atf}}{R_{co\text{-}atf}} \qquad (1)$$

The dropped coolant temperature calculation part 52 calculates the temperature $T_{DATF}$ of the dropped coolant according to the calculated heat receiving amount $Q_{co-atf}$, a heat capacity of the coolant and the coolant temperature $T_{atf}$ after passing through the cooler.

As expressed in the following Equation (2), the dropped coolant temperature calculation part 52 calculates a heat capacity $C_{atf}$ of the coolant using a calculated flow rate $F_{atf}$ of the coolant and a specific heat C and a predetermined coefficient A of the coolant previously stored in the storage 55.

The dropped coolant temperature calculation part 52 calculates a temperature variation $\Delta T_{atf}$ of the coolant using the calculated heat receiving amount $Q_{co-atf}$ and the heat capacity $C_{atf}$ of the coolant.

As expressed in the following Equation (3), the dropped coolant temperature calculation part 52 calculates the temperature $T_{DATF}$ of the dropped coolant using the calculated temperature variation $\Delta T_{atf}$ of the coolant and the coolant temperature $T_{atf}$ after passing through the cooler.

[Math. 2]

$$\Delta T_{atf} = \frac{Q_{co-atf}}{C_{atf}} = \frac{Q_{co-atf}}{F_{atf} \times C \times A} \quad (2)$$

[Math. 3]

$$T_{DATF} = T_{atf} + \Delta T_{atf} \quad (3)$$

Figure 8:
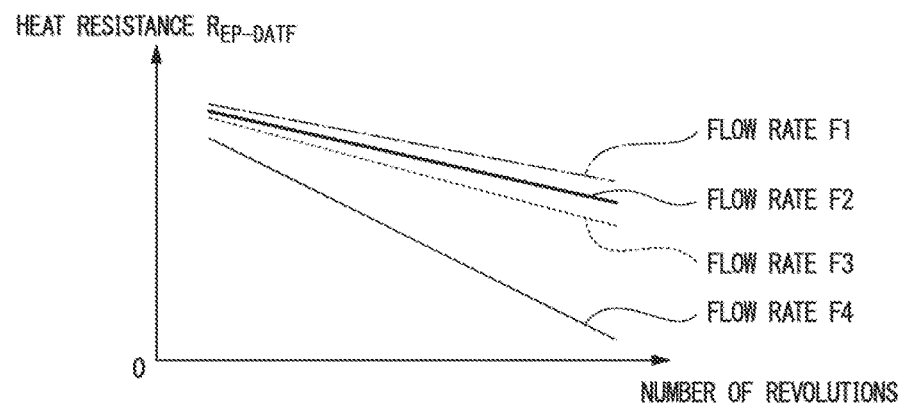
FIG. 8 is a view showing an interrelation of heat resistance between a dropped coolant and an end surface plate, a flow rate of a coolant, and the number of revolutions in the driving motor of the magnet temperature estimation device for a rotating electric machine according to the embodiment of the present invention.

The magnet temperature calculation part 53 calculates a heat resistance $R_{EP-DATF}$ between the dropped coolant and the end surface plates 24b according to the number of revolutions of the driving motor 11 detected by the first number-of-revolutions sensor 44 and the flow rate $F_{atf}$ of the coolant calculated by the dropped coolant temperature calculation part 52. As shown in FIG. 8, the magnet temperature calculation part 53 previously stores a map or the like showing a mutual relationship between the heat resistance $R_{EP-DATF}$ between the dropped coolant and the end surface plates 24b, the flow rate $F_{atf}$ of the coolant, and the number of revolutions of the driving motor 11 in the storage 55. The magnet temperature calculation part 53 calculates the heat resistance $R_{EP-DATF}$ between the dropped coolant and the end surface plates 24b with reference to the data previously stored in the storage 55 using the flow rate $F_{atf}$ of the coolant and the number of revolutions of the driving motor 11. The magnet temperature calculation part 53 calculates the heat resistance $R_{EP-DATF}$ while performing linear interpolation or the like with respect to the flow rate $F_{atf}$, for example, using a map or the like showing a mutual relationship between the number of revolutions and the heat resistance $R_{EP-DATF}$ with respect to flow rates $F_{atf}$ (F1<F2<F3<F4) of a plurality of different coolants.

The magnet temperature calculation part 53 calculates a temperature $T_{MAG}$ of the magnet 23 according to the calculated heat resistance $R_{EP-DATF}$, the temperature $T_{DATF}$ of the dropped coolant calculated by the dropped coolant temperature calculation part 52, the iron loss $W_{YOKE}$ of the rotor yoke 24a and the eddy current loss $W_{MAG}$ of the magnet 23 calculated by the heating value calculation part 51.

As expressed in the following Equation (4), the magnet temperature calculation part 53 calculates the temperature $T_{EP}$ of the end surface plates 24b using a last count temperature $T_{EP}$(pre) of the end surface plates 24b stored in the storage 55 and a temperature variation $\Delta T_{EP}$ of the end surface plates 24b. The magnet temperature calculation part 53 estimates the temperature variation $\Delta T_{EP}$ of the end surface plates 24b by, for example, an appropriate calculation or the like.

[Math. 4]

$$T_{EP} = T_{EP}(\text{pre}) + \Delta T_{EP} \quad (4)$$

As expressed in the following Equation (5), the magnet temperature calculation part 53 calculates a heat receiving amount $Q_{EP-DATF}$ of the dropped coolant from the end surface plates 24b using the heat resistance $R_{EP-DATF}$ between the calculated dropped coolant and the end surface plates 24b, the temperature $T_{EP}$ of the end surface plates 24b, and the temperature $T_{DATF}$ of the dropped coolant.

As expressed in the following Equation (6), the magnet temperature calculation part 53 finds that a heat receiving amount $Q_{YOKE-EP}$ of the end surface plates 24b from the rotor yoke 24a is equal to the heat receiving amount $Q_{EP-DATF}$ of the dropped coolant from the end surface plates 24b.

[Math. 5]

$$Q_{EP-DATF} = \frac{T_{EP} - T_{DATF}}{R_{EP-DATF}} \quad (5)$$

[Math. 6]

$$Q_{YOKE-EP} = Q_{EP-DATF} \quad (6)$$

The magnet temperature calculation part 53 calculates a heat receiving amount $Q_{MAG-YOKE}$ of the rotor yoke 24a from the magnet 23 using a last count temperature $T_{MAG}$(pre) of the magnet 23 and a heat resistance $R_{MAG-YOKE}$ between the rotor yoke 24a and the magnet 23 stored in the storage 55, and an estimated temperature $T_{YOKE}$(est) of the rotor yoke 24a. The magnet temperature calculation part 53 calculates the heat receiving amount $Q_{MAG-YOKE}$ by dividing a difference between the estimated value $T_{YOKE}$(est) and the last count $T_{MAG}$(pre) by the heat resistance $R_{MAG-YOKE}$.

The magnet temperature calculation part 53 stores, for example, a predetermined constant value serving as the heat resistance $R_{MAG-YOKE}$ between the rotor yoke 24a and the magnet 23 in the storage 55. The magnet temperature calculation part 53 estimates an estimated value $T_{YOKE}$(est) of the temperature of the rotor yoke 24a by, for example, an appropriate calculation or the like.

As expressed in the following Equation (7), the magnet temperature calculation part 53 calculates a heat receiving amount $Q_{YOKE}$ of the rotor yoke 24a using the calculated heat receiving amount $Q_{YOKE-EP}$ of the end surface plates 24b from the rotor yoke 24a, the calculated heat receiving amount $Q_{MAG-YOKE}$ of the rotor yoke 24a from the magnet 23 and the iron loss $W_{YOKE}$ of the rotor yoke 24a.

[Math. 7]

$$Q_{YOKE} = W_{YOKE} + Q_{MAG-YOKE} - Q_{YOKE-EP} \quad (7)$$

As expressed in the following Equation (8), the magnet temperature calculation part 53 calculates a temperature variation $\Delta T_{YOKE}$ of the rotor yoke 24a using a heat capacity $C_{YOKE}$ of the rotor yoke 24a stored in the storage 55 and the calculated heat receiving amount $Q_{YOKE}$ of the rotor yoke 24a.

As expressed in the following Equation (9), the magnet temperature calculation part 53 calculates a temperature $T_{YOKE}$ of the rotor yoke 24a using a last count temperature $T_{YOKE}(\text{pre})$ of the rotor yoke 24a stored in the storage 55 and the calculated temperature variation $\Delta T_{YOKE}$ of the rotor yoke 24a.

[Math. 8]
$$\Delta T_{YOKE} = \frac{Q_{YOKE}}{C_{YOKE}} \qquad (8)$$

[Math. 9]
$$T_{YOKE} = T_{YOKE}(\text{pre}) + \Delta T_{YOKE} \qquad (9)$$

As expressed in the following Equation (10), the magnet temperature calculation part 53 calculates a heat reduction amount (that is, a heat radiation amount) $Q_{MAG}$ from the magnet 23 using the last count temperature $T_{MAG}(\text{pre})$ of the magnet 23 and the heat resistance $R_{MAG\text{-}YOKE}$ between the rotor yoke 24a and the magnet 23 stored in the storage 55, and the calculated temperature $T_{YOKE}$ of the rotor yoke 24a.

As expressed in the following Equation (1), the magnet temperature calculation part 53 calculates a temperature variation $\Delta T_{MAG}$ of the magnet 23 using a heat capacity $C_{MAG}$ of the magnet 23 stored in the storage 55, the calculated heat reduction amount $Q_{MAG}$, and the eddy current loss $W_{MAG}$ of the magnet 23.

As expressed in the following Equation (12), the magnet temperature calculation part 53 calculates the temperature $T_{MAG}$ of the magnet 23 using the last count temperature $T_{MAG}(\text{pre})$ of the magnet 23 stored in the storage 55 and the calculated temperature variation $\Delta T_{MAG}$ of the magnet 23.

[Math. 10]
$$Q_{MAG} = \frac{T_{MAG}(\text{pre}) - T_{YOKE}}{R_{MAG\text{-}YOKE}} \qquad (10)$$

[Math. 11]
$$\Delta T_{MAG} = \frac{(W_{MAG} - Q_{MAG})}{C_{MAG}} \qquad (11)$$

[Math. 12]
$$T_{MAG} = T_{MAG}(\text{pre}) + \Delta T_{MAG} \qquad (12)$$

The motor controller 54 controls the driving motor 11 and the generating motor 12 by outputting a control signal for controlling the transmission 13 and the power conversion part 15 on the basis of the temperature $T_{MAG}$ of the magnet 23 calculated by the magnet temperature calculation part 53.

The magnet temperature estimation device 10 for a rotating electric machine according to the present embodiment includes the above-mentioned configuration, and an operation of the magnet temperature estimation device 10 for a rotating electric machine, i.e., the magnet temperature estimation method for a rotating electric machine, will be described.

Hereinafter, processing in which the control device 17 calculates the temperature $T_{MAG}$ of the magnet 23 of the driving motor 11 and controls the driving motor 11 will be described.

Figure 9:
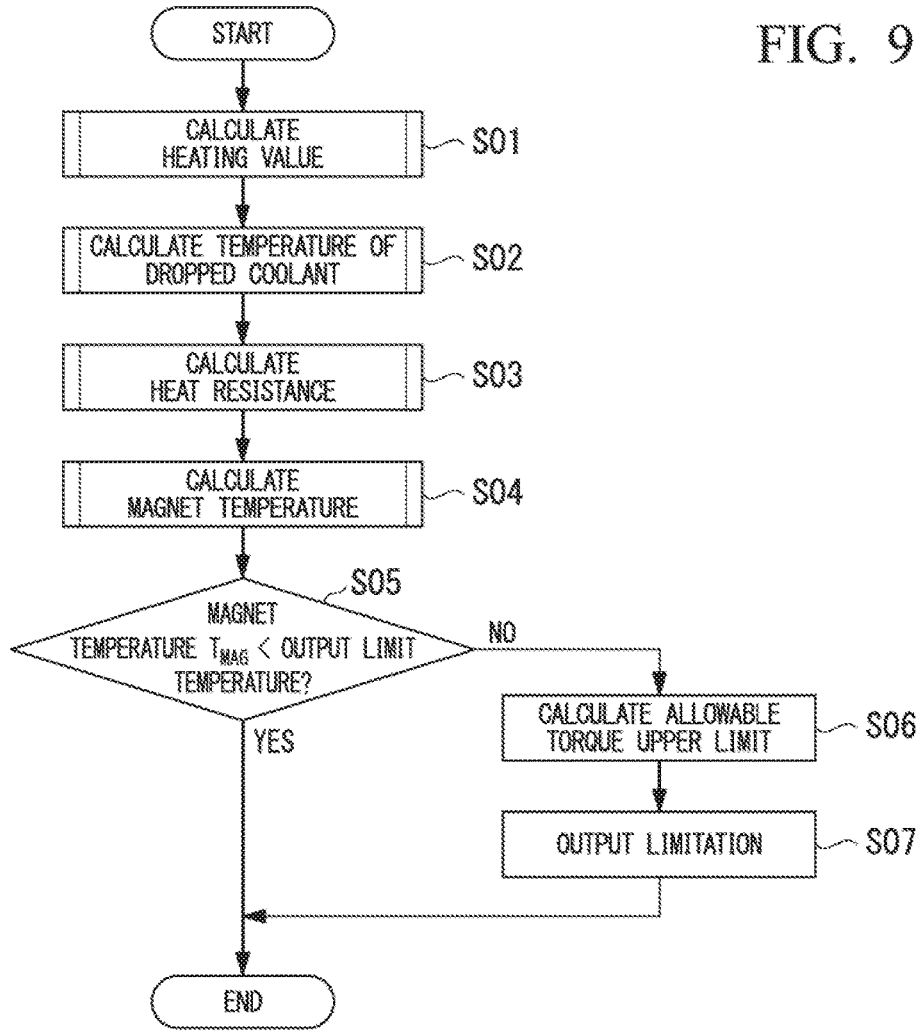
FIG. 9 is a flowchart showing an operation of the magnet temperature estimation device for a rotating electric machine according to the embodiment of the present invention.

First, as shown in FIG. 9, the control device 17 calculates a heating value due to loss of respective parts of the driving motor 11 (step S01).

Next, the control device 17 calculates the temperature $T_{DATF}$ of dropped coolant (step S02).

Next, the control device 17 calculates the heat resistance $R_{EP\text{-}DATF}$ between the dropped coolant and the end surface plates 24b (step S03).

Next, the control device 17 calculates the temperature $T_{MAG}$ of the magnet 23 (step S04).

Next, the control device 17 determines whether the calculated temperature $T_{MAG}$ of the magnet 23 is less than a predetermined output limit temperature (step S05).

When the determination result is "YES," the control device 17 terminates the processing without performing output limitation of the driving motor 11 (YES in step S05).

On the other hand, when the determination result is "NO," the control device 17 advances the processing to step S06 (NO in step S05).

Then, the control device 17 calculates an upper limit of allowable torque of the driving motor 11 (step S06).

Next, the control device 17 outputs a control signal for instructing the power conversion part 15 to make the torque of the driving motor 11I to the upper limit of allowable torque or less (step S07). Then, the control device 17 terminates the processing.

Hereinafter, heating value calculation processing of the above-mentioned step S01 will be described.

Figure 10:
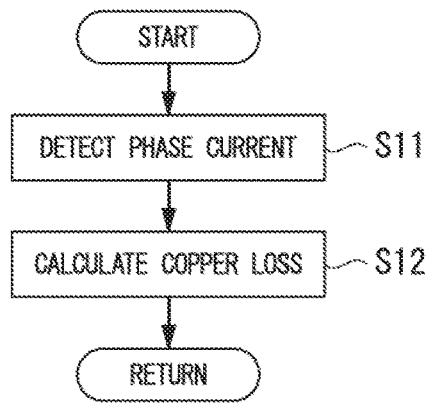
FIG. 10 is a flowchart showing one heating value calculation processing shown in FIG. 9.

First, as shown in FIG. 10, the control device 17 acquires a 3-phase phase current of the driving motor 11 (i.e., an alternating current of the 3-phase coil 21) detected by the second current sensor 43 (step S11).

Next, the control device 17 calculates a copper loss of the 3-phase coil 21 according to the acquired phase current of the 3-phase coil 21 and a resistance value of the 3-phase coil 21 previously stored in the storage 55 (step S12). Then, the control device 17 terminates the processing.

Figure 11:
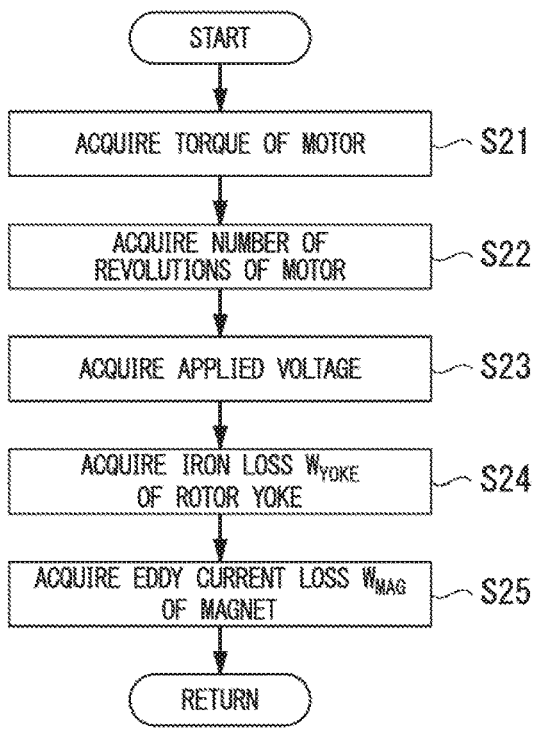
FIG. 11 is a flowchart showing another heating value calculation processing shown in FIG. 9.

In addition, as shown in FIG. 11, the control device 17 acquires the torque of the driving motor 11 detected by the torque sensor 46 (step S21).

Next, the control device 17 acquires the number of revolutions of the driving motor 11 detected by the first number-of-revolutions sensor 44 (step S22).

Next, the control device 17 acquires the applied voltage detected by the voltage sensor 41 (step S23).

Next, the control device 17 calculates the iron loss $W_{YOKE}$ of the rotor yoke 24a with reference to the data previously stored in the storage 55 using the torque, the number of revolutions and the applied voltage, which are acquired. Then, the control device 17 stores the calculated iron loss $W_{YOKE}$ of the rotor yoke 24a in the storage 55 (step S24).

Next, the control device 17 calculates the eddy current loss $W_{MAG}$ of the magnet 23 with reference to the data previously stored in the storage 55 using the torque, the number of revolutions and the applied voltage, which are acquired. Then, the control device 17 stores the calculated eddy current loss $W_{MAG}$ of the magnet 23 in the storage 55 (step S25). Then, the control device 17 terminates the processing.

Hereinafter, dropped coolant temperature calculation processing of the above-mentioned step S02 will be described.

Figure 12:
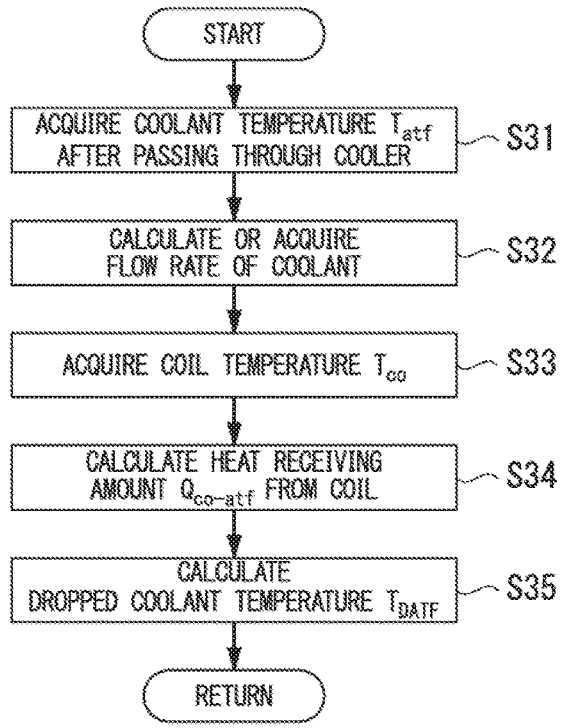
FIG. 12 is a flowchart showing dropped coolant temperature calculation processing shown in FIG. 9.

First, as shown in FIG. 12, the control device 17 acquires the coolant temperature $T_{atf}$ after passing through the cooler detected by the coolant temperature sensor 47 (step S31).

Next, the control device 17 calculates the flow rate $F_{atf}$ of the coolant with reference to the data previously stored in the storage 55 using the number of revolutions detected by the second number-of-revolutions sensor 45. Alternatively, the flow rate $F_{atf}$ of the coolant is acquired from a flow rate sensor or the like (step S32).

Next, the control device 17 acquires the coil temperature $T_{co}$, detected by the coil temperature sensor 48 (step S33).

Next, the control device 17 calculates the heat resistance $R_{co\text{-}atf}$ between the dropped coolant and the 3-phase coil 21 with respect to the data previously stored in the storage 55 using the flow rate $F_{atf}$ of the coolant. Then, as expressed in the above-mentioned Equation (1), the control device 17 calculates the heat receiving amount $Q_{co\text{-}atf}$ using the heat resistance $R_{co\text{-}atf}$, the coolant temperature $T_{atf}$ after passing through the cooler, and the coil temperature $T_{co}$ (step S34).

Next, as expressed in the above-mentioned Equation (2), the control device 17 calculates the heat capacity $C_{atf}$ of the coolant using the flow rate $F_{atf}$ of the coolant, and the specific heat C and the predetermined coefficient A of the coolant previously stored in the storage 55. Then, the control device 17 calculates the temperature variation $\Delta T_{atf}$ of the coolant using the heat receiving amount $Q_{co\text{-}atf}$ and the heat capacity $C_{atf}$ of the coolant. Then, as expressed in the above-mentioned Equation (3), the control device 17 calculates the temperature $T_{DATF}$ of the dropped coolant using the temperature variation $\Delta T_{atf}$ of the coolant and the coolant temperature $T_{atf}$ after passing through the cooler. Then, the control device 17 stores the calculated temperature $T_{DATF}$ of the dropped coolant in the storage 55 (step S35). Then, the control device 17 terminates the processing.

Hereinafter, heat resistance calculation processing of the above-mentioned step S03 will be described.

Figure 13:
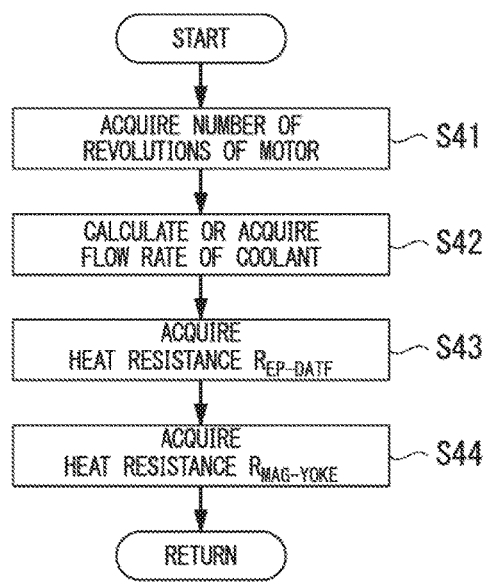
FIG. 13 is a flowchart showing heat resistance calculation processing shown in FIG. 9.

First, as shown in FIG. 13, the control device 17 acquires the number of revolutions of the driving motor 11 (step S41).

Next, the control device 17 calculates or acquires the flow rate $F_{atf}$ of the coolant (step S42).

Next, the control device 17 calculates the heat resistance $R_{EP\text{-}DATF}$ between the dropped coolant and the end surface plates 24b with reference to the data previously stored in the storage 55 using the flow rate $F_{atf}$ of the coolant and the number of revolutions of the driving motor 11. Then, the control device 17 stores the calculated heat resistance $R_{EP\text{-}DATF}$ in the storage 55 (step S43).

Next, the control device 17 acquires the heat resistance $R_{MAG\text{-}YOKE}$ between the rotor yoke 24a and the magnet 23, which is a predetermined constant value previously stored in the storage 55 (step S44).

Then, the control device 17 terminates the processing.

Hereinafter, magnet temperature calculation processing of the above-mentioned step S04 will be described.

Figure 14:
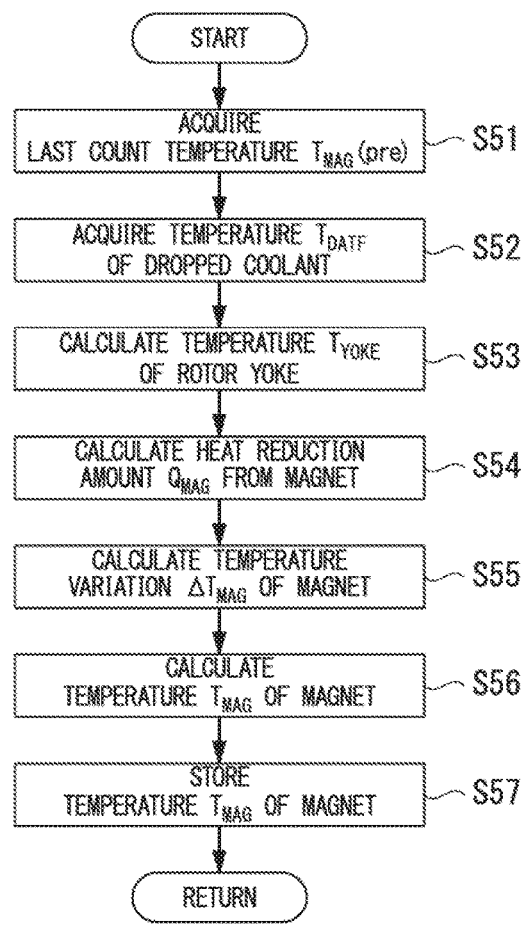
FIG. 14 is a flowchart showing magnet temperature calculation processing shown in FIG. 9.

First, as shown in FIG. 14, the control device 17 acquires the last count temperature $T_{MAG}(\text{pre})$ of the magnet 23 stored in the storage 55 (step S51).

Next, the control device 17 acquires the temperature $T_{DATF}$ of the dropped coolant (step S52).

Next, as expressed in the above-mentioned Equation (4), the control device 17 calculates the temperature $T_{EP}$ of the end surface plates 24b using the last count temperature $T_{EP}(\text{pre})$ of the end surface plates 24b stored in the storage 55 and the temperature variation $\Delta T_{EP}$ of the end surface plates 24b. Then, the control device 17 stores the calculated temperature $T_{EP}$ of the end surface plates 24b in the storage 55. Then, as expressed in the above-mentioned Equation (5), the control device 17 calculates the heat receiving amount $Q_{EP\text{-}DATF}$ of the dropped coolant from the end surface plates 24b using the heat resistance $R_{EP\text{-}DATF}$ between the dropped coolant and the end surface plates 24b, the temperature $T_{EP}$ of the end surface plates 24b, and the temperature $T_{DATF}$ of the dropped coolant. Then, as expressed in the above-mentioned Equation (6), the control device 17 finds that the heat receiving amount $Q_{YOKE\text{-}EP}$ of the end surface plates 24b from the rotor yoke 24a is equal to the heat receiving amount $Q_{EP\text{-}DATF}$ of the dropped coolant from the end surface plates 24b. Then, the control device 17 calculates the heat receiving amount $Q_{MAG\text{-}YOKE}$ of the rotor yoke 24a from the magnet 23 using the last count temperature $T_{MAG}(\text{pre})$ of the magnet 23 and the heat resistance $R_{MAG\text{-}YOKE}$ between the rotor yoke 24a and the magnet 23 stored in the storage 55, and the estimated temperature $T_{YOKE}(\text{est})$ of the rotor yoke 24a. Then, as expressed in the above-mentioned Equation (7), the control device 17 calculates the heat receiving amount $Q_{YOKE}$ of the rotor yoke 24a using the heat receiving amount $Q_{YOKE\text{-}EP}$ of the end surface plates 24b from the rotor yoke 24a, the heat receiving amount $Q_{MAG\text{-}YOKE}$ of the rotor yoke 24a from the magnet 23, and the iron loss $W_{YOKE}$ of the rotor yoke 24a. Then, as expressed in the above-mentioned Equation (8), the control device 17 calculates the temperature variation $\Delta T_{YOKE}$ of the rotor yoke 24a using the heat capacity $C_{YOKE}$ of the rotor yoke 24a stored in the storage 55 and the heat receiving amount $Q_{YOKE}$ of the rotor yoke 24a. Then, as expressed in the above-mentioned Equation (9), the control device 17 calculates the temperature $T_{YOKE}$ of the rotor yoke 24a using the last count temperature $T_{YOKE}(\text{pre})$ of the rotor yoke 24a stored in the storage 55 and the temperature variation $\Delta T_{YOKE}$ of the rotor yoke 24a. Then, the control device 17 stores the calculated temperature $T_{YOKE}$ of the rotor yoke 24a in the storage 55 (step S53).

Next, as expressed in the above-mentioned Equation (10), the control device 17 calculates the heat reduction amount $Q_{MAG}$ from the magnet 23 using the last count temperature $T_{MAG}(\text{pre})$ of the magnet 23 and the heat resistance $R_{MAG\text{-}YOKE}$ between the rotor yoke 24a and the magnet 23 stored in the storage 55, and the temperature $T_{YOKE}$ of the rotor yoke 24a (step S54).

Next, as expressed in the above-mentioned Equation (11), the control device 17 calculates the temperature variation $\Delta T_{MAG}$ of the magnet 23 using the heat capacity $C_{MAG}$ of the magnet 23 stored in the storage 55, the heat reduction amount $Q_{MAG}$, and the eddy current loss $W_{MAG}$ of the magnet 23 (step S55).

Next, as expressed in the above-mentioned Equation (12), the control device 17 calculates the temperature $T_{MAG}$ of the magnet 23 using the last count temperature $T_{MAG}(\text{pre})$ of the magnet 23 stored in the storage 55 and the temperature variation $\Delta T_{MAG}$ of the magnet 23 (step S56).

Next, the control device 17 stores the calculated temperature $T_{MAG}$ of the magnet 23 in the storage 55 (step S57). Then, the control device 17 terminates the processing.

As described above, the magnet temperature estimation device 10 and the magnet temperature estimation method for a rotating electric machine according to the embodiment includes the magnet temperature calculation part 53 configured to calculate the temperature $T_{MAG}$ of the magnet 23 using the temperature $T_{DATF}$ of the dropped coolant. For this reason, calculation precision of the temperature $T_{MAG}$ of the magnet 23 can be improved.

In addition, the magnet temperature estimation device 10 and the magnet temperature estimation method for a rotating electric machine according to the embodiment includes the magnet temperature calculation part 53 using a heat model in which the dropped coolant that receives heat from the coil 21 cools the magnet 23. For this reason, the temperature $T_{MAG}$ of the magnet 23 can be precisely calculated according to the cooling path of the coolant in the driving motor 11 and a cooling state of the coil 21 and the magnet 23.

Further, the magnet temperature estimation device 10 and the magnet temperature estimation method for a rotating electric machine according to the embodiment includes the magnet temperature calculation part 53 configured to calculate the heat resistance $R_{EP\text{-}DATF}$ between the dropped coolant and the end surface plates 24b and calculate the heat reduction amount $Q_{MAG}$ from the magnet 23 using the heat resistance $R_{EP\text{-}DATF}$. For this reason, a heat radiation amount from the magnet 23 due to the dropped coolant can be precisely calculated.

Further, the magnet temperature estimation device 10 and the magnet temperature estimation method for a rotating electric machine according to the embodiment includes the magnet temperature calculation part 53 configured to calculate the heat resistance $R_{EP\text{-}DATF}$ between the dropped coolant and the end surface plates 24b according to the flow rate $F_{atf}$ of the coolant and the number of revolutions of the driving motor 11. For this reason, the heat resistance $R_{EP\text{-}DATF}$ can be precisely calculated according to a state of the dropped coolant in the rotor 24.

Further, the magnet temperature estimation device 10 and the magnet temperature estimation method for a rotating electric machine according to the embodiment includes the magnet temperature calculation part 53 configured to calculate the temperature $T_{MAG}$ of the magnet 23 using the eddy current loss $W_{MAG}$ of the magnet 23 and the heat reduction amount $Q_{MAG}$ from the magnet 23. For this reason, the temperature variation $\Delta T_{MAG}$ of the magnet 23 can be precisely calculated according to a difference between the heating value and a heat radiation amount due to loss of the magnet 23.

Further, the magnet temperature estimation device 10 and the magnet temperature estimation method for a rotating electric machine according to the embodiment includes the dropped coolant temperature calculation part 52 configured to acquire the heat receiving amount $Q_{co\text{-}atf}$ of the dropped coolant from the 3-phase coil 21 and the heat capacity $C_{atf}$ of the coolant according to the flow rate $F_{atf}$ of the coolant. For this reason, the temperature $T_{DATF}$ of the dropped coolant can be precisely calculated according to a state (a contact state or the like) of the dropped coolant in the rotor 24.

Further, the magnet temperature estimation device 10 and the magnet temperature estimation method for a rotating electric machine according to the embodiment includes the dropped coolant temperature calculation part 52 configured to acquire the beat resistance $R_{co\text{-}atf}$ between the dropped coolant and the 3-phase coil 21 according to the flow rate $F_{atf}$ the coolant. For this reason, the beat resistance $R_{co\text{-}atf}$ can be precisely calculated according to a state of the coolant in the 3-phase coil 21.

Further, in the above-mentioned embodiment, while the control device 17 calculates the heat reduction amount $Q_{MAG}$ from the magnet 23 according to the holding of the magnet 23 in the rotor yoke 24a such that the magnet 23 in the driving motor 11 does not come into direct contact with the end surface plates 24b, it is not limited thereto. For example, in the heat model shown in FIG. 3, the heat reduction amount $Q_{MAG}$ from the magnet 23 may also be calculated to correspond to each of the cases in which the end surface plates 24b, the rotor yoke 24a, or the end surface plates 24b and the rotor yoke 24a are omitted.

For example, the case in which the magnet 23 in the driving motor 11 comes into direct contact with the end surface plates 24b to be held at the rotor yoke 24a corresponds to the case in which the rotor yoke 24a in the heat model shown in FIG. 3 is omitted.

For example, the case in which the end surface plates 24b in the driving motor 11 are omitted and the dropped coolant comes into direct contact with the magnet 23 corresponds to the case in which the end surface plates 24b and the rotor yoke 24a in the heat model shown in FIG. 3 are omitted.

For example, the case in which the end surface plates 24b in the driving motor 11 is omitted and the dropped coolant does not come into direct contact with the magnet 23 corresponds to the case in which the end surface plates 24b in the heat model shown in FIG. 3 are omitted.

The control device 17 may calculate the heat reduction amount $Q_{MAG}$ from the magnet 23 using the heat resistance and the heat receiving amount corresponding to each of the heat models.

Further, in the above-mentioned embodiment, the control device 17 acquires the flow rate of the coolant from the number of revolutions of the generating motor 12 because the mechanical pump of the coolant circulation section 14 is connected to the rotary shaft of the generating motor 12, but it is not limited thereto. For example, when the coolant circulation section 14 includes a flow rate sensor configured to detect a flow rate of the coolant in the coolant flow path 14a, the flow rate of the coolant detected by the flow rate sensor may be acquired. Further, the coolant circulation section 14 may include an electric pump instead of the mechanical pump.

Further, in the above-mentioned embodiment, while the magnet temperature estimation device 10 for a rotating electric machine includes the coil temperature sensor 48, it is not limited thereto and the coil temperature sensor 48 may be omitted. The control device 17 may estimate a temperature of the coil 21 (a coil temperature) of the driving motor 11 by, for example, an appropriate calculation or the like.

Further, in the above-mentioned embodiment, while the magnet temperature estimation device 10 for a rotating electric machine includes the torque sensor 46, it is not limited thereto and the torque sensor 46 may be omitted. The control device 17 may acquire a torque indicator value according to an alternating current flowing through the coils 21 of the driving motor 11 detected by the second current sensor 43 and a rotation angle of the driving motor 11 detected by the first number-of-revolutions sensor 44.

Further, in the above-mentioned embodiment, while each of the driving motor 11 and the generating motor 12 includes the coil 21 of segment conductor (SC) winding, it is not limited thereto. Each of the driving motor 11 and the generating motor 12 may be a motor having another winding structure such as concentrated winding, distributed winding or the like.

The above-mentioned embodiment is exemplarily provided, and is not intended to limit the scope of the present invention. The above-mentioned novel embodiment may be performed as other various types, and various omissions, substitutions and changes may be made without departing from the scope of the present invention. The above-mentioned embodiment or modifications thereof are included in the scope of the present invention and included in the scope equivalent of the present invention disclosed in the scope of the claims.

REFERENCE SIGNS LIST

10 Magnet temperature estimation device for rotating electric machine
11 Driving motor (rotating electric machine)
12 Generating motor
13 Transmission
14 Coolant circulation section (coolant supply part)
14b Cooler (cooling part)
15 Power conversion part 16 Battery
17 Control device
21 Coil
22 Stator
23 Magnet
24 Rotor
24a Rotor yoke
24b End surface plate
51 Heating value calculation part
52 Dropped coolant temperature calculation part (coolant temperature calculation part)
53 Magnet temperature calculation part
54 Motor controller
55 Storage

The invention claimed is:

1. A magnet temperature estimation device for a rotating electric machine, the magnet temperature estimation device comprising:
a rotating electric machine configured with a rotor having a magnet and a stator having a coil;
a coolant supply part configured to supply a coolant flowing from the stator toward the rotor; and
a magnet temperature calculation part configured to calculate a temperature of the magnet using a temperature of the coolant that has received heat from the coil,
wherein the magnet temperature calculation part
calculates a heat resistance of at least a portion between the magnet and the coolant that has received heat from the coil,
calculates a heat reduction amount from the magnet using the heat resistance and a temperature of the coolant that has received heat from the coil, and
calculates the temperature of the magnet using the heat reduction amount from the magnet, and
wherein the magnet temperature estimation device controls the operation of the rotating electric machine based on the calculated temperature of the magnet.

2. The magnet temperature estimation device for a rotating electric machine according to claim 1,
wherein the magnet temperature calculation part calculates the heat resistance in accordance with a flow rate of the coolant and number of revolutions of the rotating electric machine.

3. The magnet temperature estimation device for a rotating electric machine according to claim 2, comprising a heating value calculation part configured to calculate a heating value due to loss of the magnet,
wherein the magnet temperature calculation part calculates the temperature of the magnet using the heating value due to the loss of the magnet and the heat reduction amount from the magnet.

4. The magnet temperature estimation device for a rotating electric machine according to claim 2, comprising a coolant temperature calculation part configured to calculate the temperature of the coolant that has received heat from the coil,
wherein the coolant temperature calculation part
acquires a heat receiving amount of the coolant that has received heat from the coil and a heat capacity of the coolant in accordance with the flow rate of the coolant, and
calculates the temperature of the coolant that has received heat from the coil using the heat receiving amount of the coolant that has received heat from the coil and the heat capacity of the coolant.

5. The magnet temperature estimation device for a rotating electric machine according to claim 1, comprising: a heating value calculation part configured to calculate a heating value due to loss of the magnet,
wherein the magnet temperature calculation part calculates the temperature of the magnet using the heating value due to the loss of the magnet and the heat reduction amount from the magnet.

6. The magnet temperature estimation device for a rotating electric machine according to claim 5, comprising a coolant temperature calculation part configured to calculate the temperature of the coolant that has received heat from the coil,
wherein the coolant temperature calculation part
acquires a heat receiving amount of the coolant that has received heat from the coil and a heat capacity of the coolant in accordance with the flow rate of the coolant, and
calculates the temperature of the coolant that has received heat from the coil using the heat receiving amount of the coolant that has received heat from the coil and the heat capacity of the coolant.

7. The magnet temperature estimation device for a rotating electric machine according to claim 1, comprising a coolant temperature calculation part configured to calculate the temperature of the coolant that has received heat from the coil,
wherein the coolant temperature calculation part
acquires a heat receiving amount of the coolant that has received heat from the coil and a heat capacity of the coolant in accordance with the flow rate of the coolant, and
calculates the temperature of the coolant that has received heat from the coil using the heat receiving amount of the coolant that has received heat from the coil and the heat capacity of the coolant.

8. The magnet temperature estimation device for a rotating electric machine according to claim 7, comprising a cooling part configured to cool the coolant,
wherein the coolant temperature calculation part
acquires a heat resistance between the coil and the coolant that has received heat from the coil in accordance with the flow rate of the coolant, and
calculates the heat receiving amount of the coolant that has received heat from the coil using the heat resistance between the coil and the coolant that has received heat from the coil, the temperature of the coil, and a temperature of the coolant cooled by the cooling part.

9. A magnet temperature estimation method for a rotating electric machine performed by a control device with respect to:
a rotating electric machine configured with a rotor having a magnet and a stator having a coil, and
a coolant supply part configured to supply a coolant flowing from the stator toward the rotor,
the magnet temperature estimation method for a rotating electric machine comprising:
calculating a temperature of the magnet using a temperature of a coolant that has received heat from the coil,
wherein the calculating the temperature of the magnet includes
calculating a heat resistance of at least a portion between the magnet and the coolant that has received heat from the coil,
calculating a heat reduction amount from the magnet using the heat resistance and a temperature of the coolant that has received heat from the coil, and
calculating the temperature of the magnet using the heat reduction amount from the magnet, and controlling the operation of the rotating electric machine based on the calculated temperature of the magnet.

10. The magnet temperature estimation device according to claim 9, wherein the magnet temperature estimation device controls the transmission or power conversion of the rotating electric machine based on the calculated temperature of the magnet.

11. The magnet temperature estimation method according to claim 9, wherein said controlling the operation of the rotating electric machine based on the calculated temperature of the magnet includes controlling the transmission or power conversion of the rotating electric machine.

12. A magnet temperature estimation device for a rotating electric machine, the magnet temperature estimation device comprising:
 a rotating electric machine configured with a rotor having a magnet and a stator having a coil;
 a coolant supply part configured to supply a coolant flowing from the stator toward the rotor;
 a magnet temperature calculation part configured to calculate a temperature of the magnet using a temperature of the coolant that has received heat from the coil; and
 a coolant temperature calculation part configured to calculate the temperature of the coolant that has received heat from the coil,
 wherein the coolant temperature calculation part
 acquires a heat receiving amount of the coolant that has received heat from the coil and a heat capacity of the coolant in accordance with the flow rate of the coolant, and
 calculates the temperature of the coolant that has received heat from the coil using the heat receiving amount of the coolant that has received heat from the coil and the heat capacity of the coolant, and
 wherein the magnet temperature estimation device controls the operation of the rotating electric machine based on the calculated temperature of the magnet.

13. The magnet temperature estimation device according to claim 12, wherein the magnet temperature estimation device controls the operation of the rotating electric machine based on the calculated temperature of the magnet includes controlling the transmission or power conversion of the rotating electric machine.

* * * * *